Aug. 10, 1943.    J. H. HALSTEAD    2,326,355
HYDRAULIC PACKING
Filed Nov. 19, 1941
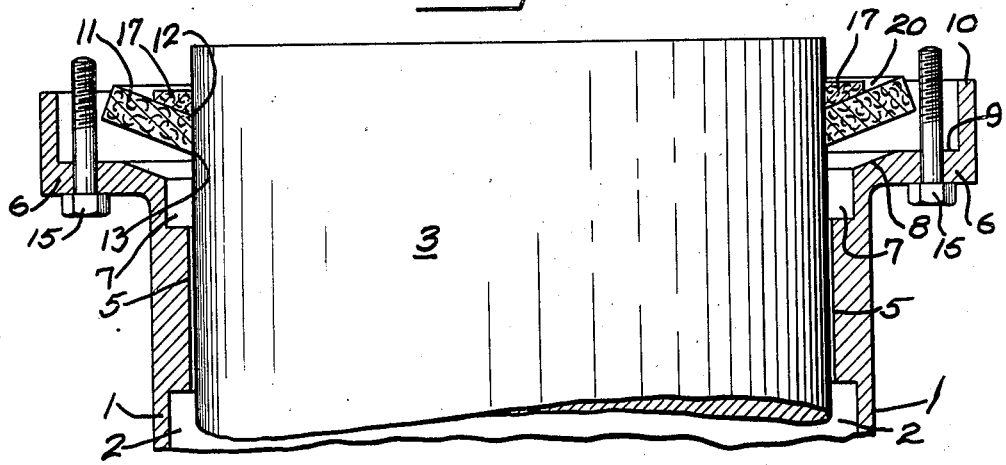
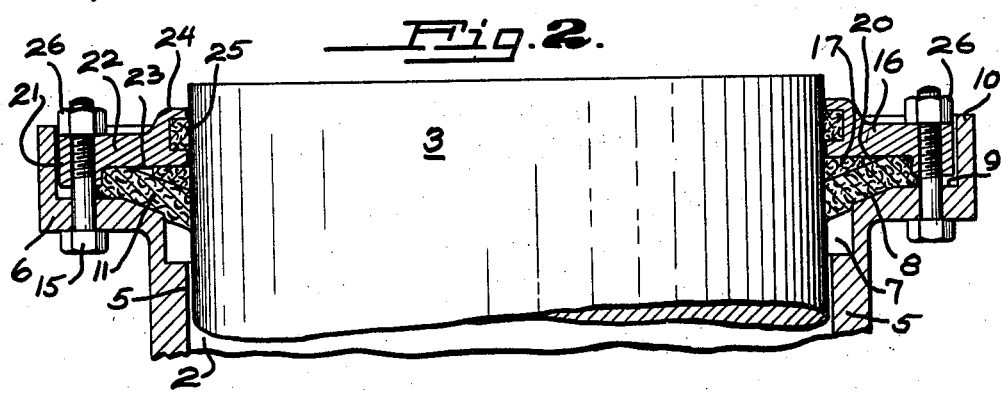
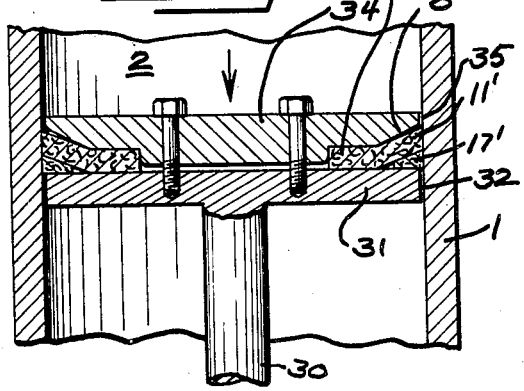
INVENTOR,
JOHN H. HALSTEAD.
BY
ATTORNEYS.

Patented Aug. 10, 1943

2,326,355

UNITED STATES PATENT OFFICE 2,326,355

HYDRAULIC PACKING

John H. Halstead, San Jose, Calif.

Application November 19, 1941, Serial No. 419,739

7 Claims. (Cl. 286—26)

My invention relates to hydraulic packing, and more particularly to a packing and packing gland that can be subjected to lateral forces with no appreciable leakage of fluid past the packing.

My invention is particularly applicable for use as low pressure packing between the cylinder and piston of a hydraulic vehicle lift, or similar device.

Among the objects of my invention are: To provide a hydraulic packing and gland which will permit the packing to a substantially constant pressure against an opposing movable member; to provide a type of hydraulic packing that will permit side-play between two relatively movable members without appreciable fluid leakage; to provide a coned packing, together with means for holding such packing in proper position to exert pressure against a relatively movable member; and to provide a simple, efficient and easily installed packing between relatively movable members.

Other objects of my invention will be apparent or will be specifically pointed out in the description forming a part of this specification, but I do not limit myself to the embodiment of the invention herein described, as various forms may be adopted within the scope of the claims.

In the drawing:

Fig. 1 is a longitudinal view, partly in section and partly in elevation, of a portion of an automobile lift embodying my invention, showing a preliminary step in installing the packing.

Fig. 2 is a view similar to that of Fig. 1, showing the packing as finally installed.

Fig. 3 is a view, partly in elevation and partly in section, of one preferred form of packing installed on a piston movable with relation to a cylinder.

My invention may be more fully understood by direct reference to the drawings, showing preferred embodiments of my invention. In the first modification, shown in Figs. 1 and 2, a hydraulic cylinder 1 is provided, having a fluid chamber 2 therein, in which a piston 3 is positioned, to be moved in and out of the cylinder by application of fluid from outside the cylinder, as is well known in the art, supporting members being customarily bolted to the top of the piston. At its upper end cylinder 1 is provided with an inwardly extending shoulder 5 of slightly larger internal diameter than piston 3, so that under normal no load circumstances as piston 3 moves in and out of cylinder 1, no contact will be made between these two elements.

The top of cylinder 1 just above shoulder 5, is provided with an outwardly extending flange 6, this flange forming an annular channel 7 just above shoulder 5, and having an annular bevel 8, a flat surface 9, and an upwardly extending termination 10, as seen in order from inside the cylinder to the terminal portion 10. A normally flat packing ring 11 is provided of, for example, thick rubberized fabric. This packing ring has an inner aperture for reception of piston 3. When the packing ring is flat, this inner aperture has a major diameter 12 and a minor diameter 13, the major diameter being substantially identical with that of the piston 3, with the minor diameter 13 of the aperture substantially smaller than the diameter of piston 3.

Inasmuch as packing materials of the type used for packing a cylinder of this type are stretchable only to a minor degree, the packing ring is applied to piston 3 by coning the packing ring, as shown in Fig. 1, until major and minor diameters are substantially equal, so that the packing can be slipped over the piston. The resiliency of the packing ring is such that under these conditions it tends to maintain a coned shape, with the angle of the coned surfaces substantially equal to the angle of angular surface 8 on the flange of the cylinder.

The packing ring 11 is also made of sufficiently small external diameter so that only a short portion of the outer radial extent of the ring rests on flat surface 9 of the cylinder flange. Flat surface 9 is of sufficient outward extent to provide room for a plurality of bolts 15 to pass through the flange outside of packing ring 11, these bolts being used for the application to the packing of a retaining ring 16 having apertures formed therein registering with the bolts 15.

However, before the retaining ring is applied to the packing, a fillet ring 17 is positioned immediately above and in contact with packing ring 11. Fillet ring 17, preferably, has an angular lower surface registering with the upper coned surface of the packing ring adjacent the piston. The upper surface of the fillet ring is preferably flat and normal to the axis of the piston. The inner diameter of the fillet ring is substantially that of the piston. The outer diameter of the fillet ring is preferably less than the diameter of the packing ring 11. Thus, a space 20 is provided at the outer periphery of the fillet ring.

The retaining ring 16 has a thickened outer portion 21 through which bolts 15 pass, the horizontal portion 22 of the retaining ring having a lower horizontal surface 23 and an inner thickened portion 24 carrying a felt wiper ring 25 used to keep dust from being carried into the interior of the cylinder as the piston enters the cylinder after extension.

After the fillet ring 17 has been placed over the packing ring 11, the retaining ring is dropped over bolts 15 and nuts 26 applied, screwed down, and tightened. The outer portion of the flat surface 23 of the retaining ring forces the outer peripheral portions only of the packing against flat surface 9 of the cylinder flange 6. Thickened portion 21 of the retaining ring engages the outer edge of the packing ring 11 so that it is impossible for the packing ring 11 to move laterally as a whole.

Inasmuch as the packing ring 11 has been flattened around the outer periphery thereof, leverage is exerted by the bending of the packing ring to force the edge of the inner aperture of the packing ring against the piston. The inner portion of the packing ring, therefore, remains coned for two reasons: The diameter of the piston aperture is such that it cannot flatten out, and the other reason is that the fillet ring 17 prevents any tendency toward flattening. The fillet ring holds the inner portion of the packing ring 11 against angular surface 8 on flange 6. Thus, the ring is at all times maintained in coned position against the piston with an inwardly exerted force thereagainst.

It will, therefore, be seen that under normal no load circumstances, the packing ring holds the piston centered in cylinder 1, so that the piston does not touch any part of the shoulder 5. However, when a vehicle or other load is placed on top of the piston and the piston extended upwardly out of the cylinder by the use of fluid pressure, it can readily be seen that unless the load on the piston is perfectly balanced, there will be a tendency for the piston to move laterally with a force greater than could be normally withstood by the packing. Under these circumstances, the surface of the piston will contact the internal surface of shoulder 5 to give a positive control to any lateral movements of the piston.

However, as lateral movements of the piston with respect to the cylinder normally take place when the piston is elevated and therefore when the fluid in the cylinder is under pressure to keep the cylinder and load raised, the packing must accommodate itself to such lateral movement without any substantial loss of fluid. With many types of packing, the packing will be compressed in the direction of lateral movement and remain unchanged at points opposite to the compression, thus providing a place for leakage to take place past the packing.

Such a condition, however, does not occur with the packing just above described. If, for example, we consider Fig. 2, which shows the packing under operating conditions, and assuming that the lateral movement of the piston is towards the right of the figure, it will be seen that, as the piston moves toward the right, the fillet ring must move laterally with the piston, and that the packing ring is restrained from so moving. As the fillet ring has a wedge-shaped cross-section and is positioned between horizontal and angular surfaces forming an acute angle, the fillet ring will exert a wedging action against the packing ring, forcing the packing downwardly against the fluid pressure instead of compressing the ring 11.

At the same time, on the opposite side of the assembly, the fillet ring 17 moves out of its cavity, thus permitting the coned packing ring 11 to move upwardly under the fluid pressure to maintain its sealing contact with the piston.

Thus, the fillet ring acts as a floating wedge, moving with the piston and adjusting the position of the packing ring around the piston surface so that no opportunity for escape of liquid can occur. A tight seal is maintained at all times, and a considerable amount of lateral motion of the piston is permissible without interfering in any manner with the proper operation of the lift.

In Fig. 3, I have shown a reciprocal form of packing, embodying the same principles as shown and described in Figs. 1 and 2. Here, a piston rod 30 is provided with the piston head 31 having a clearance 32 between the outer edge thereof and the interior of cylinder 1. The packing ring 11' is coned with the outer edge thereof bearing against the interior of the cylinder. On the pressure side of the piston, the inner portion 33 of the packing ring is clamped against the piston head by a retaining disc 34, this retaining disc also having a clearance 35 between its outer edge and the cylinder wall. Retaining disc 34 is also provided with an angular surface 8' to accommodate the coned portion of packing ring 11'. The fillet ring 17' is now shaped to wedge inwardly and is positioned between the packing ring and the piston head. In this case, if the piston head moves laterally, the fillet ring is positioned as determined by its contact with the cylinder wall, and moves with respect to the coned packing ring 11' to adjust the ring 11' to the cylinder wall even though lateral displacement of the piston head occurs, exactly as has been described for the first modification of my invention.

I claim:

1. Means for packing a relatively movable cylindrical piston member and a cylinder member assembly consisting of a shoulder on one of said members extending closely adjacent and spaced from the bearing surface on the other member, said shoulder having an annular channel therein open to said bearing surface, a single normally planar packing sheet having an aperture therein, said aperture having one edge diameter fitting said bearing surface and the other edge diameter smaller than the diameter of said bearing surface, both of said edges fitting said bearing surface when said packing sheet is coned with said smaller diameter adjacent said channel with the contiguous surface in contact with the remainder of said shoulder, and an annular retaining ring bolted to said shoulder and in contact with the surface of said sheet contiguous to the larger diameter edge thereof for forcing an outer portion only of said coned sheet back to planar shape, and a fillet ring fitting said piston and having a wedge-shaped cross-section positioned between the coned portion of said packing sheet and said retaining ring, whereby lateral motion of said piston and fillet ring causes said fillet ring to distort the coned portion of said packing sheet to fit said piston in all lateral positions thereof.

2. Means for packing a relatively movable cylindrical piston member and a cylinder member assembly comprising a coned packing sheet anchored at one edge only to one of said members to restrain said packing sheet against lateral body movement and having its opposite free edge surface contacting a bearing surface on said other member, and a fillet ring fitting said bearing surface and positioned in contact with one surface of said coned packing sheet and movable relative to said packing sheet with lateral movement of said bearing surface, said fillet ring having a wedge-shaped cross-section to cause downward displacement of substantial portions of said free edge along said bearing surface in accordance with the degree of lateral movement of said bearing surface toward said free edge portions and permit upward movement of other portions of said free edge along said bearing surface in accordance with the degree of lateral movement of said bearing surface away from said last mentioned portions of said free edge.

3. Means for packing a relatively movable cylindrical piston member and a cylinder member assembly comprising a coned packing sheet anchored at one edge only to one of said members to restrain said packing sheet against lateral body movement and having its opposite free edge surface contacting a bearing surface on said other member, a fillet ring mounted on said bearing surface and means holding said fillet ring in substantially slidable contact with said coned packing sheet to cause said fillet ring to exert a wedging action against said sheet to change the cone angle in opposite directions on diametrically opposite portions of said sheet upon lateral movement between said members.

4. Apparatus in accordance with claim 3 wherein said fillet ring is tightly fitted to said bearing surface to provide an additional packing seal.

5. Means for packing a relatively movable cylindrical piston member and a cylinder member assembly comprising a coned packing sheet anchored at one edge only to one of said members to restrain said packing sheet against lateral body movement and having its opposite free edge surface contacting a bearing surface on said other member, a rigid substantially planar ring attached to said same member and having an aperture therein surrounding said bearing surface to limit lateral motion between said members, and a fillet ring positioned between and bearing against both said coned packing sheet and said rigid ring and shaped to exert a wedging action therebetween within the permitted limits of lateral motion between said members to change the cone angle in opposite directions on diametrically opposite portions of said coned packing sheet.

6. Apparatus in accordance with claim 5 wherein both said packing sheet and said fillet ring are of packing material.

7. Apparatus in accordance with claim 2 wherein said fillet ring is bounded by a free space to permit bodily displacement of said ring relative to said packing sheet in response to such lateral movement of said bearing surface.

JOHN H. HALSTEAD.